(No Model.)
F. P. ARNOLD.
HEEL RAND.
No. 356,056. Patented Jan. 11, 1887.
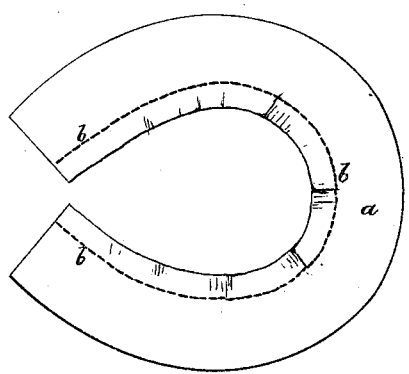
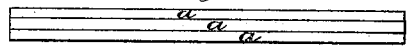
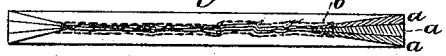
Witnesses.
S. N. Piper.
R. B. Torrey.
Inventor.
Francis P. Arnold.
by R. H. Eddy, atty.

UNITED STATES PATENT OFFICE.

FRANCIS PRESCOTT ARNOLD, OF NORTH PEMBROKE, MASSACHUSETTS.

HEEL-RAND.

SPECIFICATION forming part of Letters Patent No. 356,056, dated January 11, 1887.

Application filed April 26, 1886. Serial No. 200,152. (No model.)

*To all whom it may concern:*

Be it known that I, FRANCIS PRESCOTT ARNOLD, of North Pembroke, in the county of Plymouth, of the Commonwealth of Massachusetts, have invented a new and useful Improvement in Shoe or Boot Heel Rands; and I do hereby declare the same to be described in the following specification, and represented in the accompanying drawings, of which—

Figure 1 is a top view, Fig. 2 an edge view, and Fig. 3 a longitudinal section, of a "rand" of my improved kind or invention, the nature of which is defined in the claim hereinafter presented.

This rand is composed of a series of strips of leather, each of which is wedge-shaped in transverse section, laid one upon the other, with their narrower edges next adjacent to each other, and connected by a line of stitches extending longitudinally through the pack near such narrower edges, the whole being subsequently wet and bent into a horseshoe shape and next dried, all being substantially as represented in the drawings, in which the series of strips are shown at *a a a*, &c., and their connecting stitching at *b*.

A rand composed of a series of such strips can be turned or bent in a machine for the purpose to better advantage than one made of one single piece of leather of the thickness of the series, for when made in separate pieces, each wedge-shaped in its transverse section and laid and fastened together, as above mentioned, they bend easier and wrinkle so little, comparatively, as to require little, if any, trimming to fit them to the heel part of a sole. The stitching holds them in their proper relations to each other while they are being bent around in the horseshoe form, and allows each in its thicker part to stretch without interruption from that or those next contiguous. Besides, a rand so made can be manufactured from waste pieces of upper-leather, rather than from sole-leather, and thus enable such pieces to be utilized to advantage.

I claim—

As an improved article of manufacture, a shoe or boot heel rand, substantially as described, composed of a series of strips of leather bent in a horseshoe form and each wedge-shaped in cross-section, and all laid one on the other, with their thinner edges next each other, and combined or connected by stitching going through them near their said edges, all essentially as represented.

FRANCIS PRESCOTT ARNOLD.

Witnesses:
 ALEX. CHRISTY,
 CHARLES MULLIGAN.